United States Patent [19]
Matthäus

[11] 3,835,240
[45] Sept. 10, 1974

[54] FLUID COOLED ELECTRICAL CABLE

[75] Inventor: Günther Matthäus, Hohe Warte, Germany

[73] Assignee: Siemens Aktiengesellschaft, Munich, Germany

[22] Filed: Sept. 20, 1973

[21] Appl. No.: 399,353

[30] Foreign Application Priority Data
Sept. 28, 1972 Germany.......................... 2247716

[52] U.S. Cl................ 174/15 C, 138/113, 174/28, 174/DIG. 6
[51] Int. Cl........................................... H01v 11/00
[58] Field of Search..... 174/16 B, 99 B, 28, DIG. 6, 174/27; 138/112, 113, 114

[56] References Cited
UNITED STATES PATENTS

| | | | |
|---|---|---|---|
| 2,191,071 | 2/1940 | Duttern............................... | 174/28 |
| 3,361,870 | 1/1968 | Whitehead....................... | 174/99 B |
| 3,602,630 | 8/1971 | Sassin............................ | 138/114 X |
| 3,657,467 | 4/1972 | Matthaus et al.................. | 174/28 X |

FOREIGN PATENTS OR APPLICATIONS

| | | | |
|---|---|---|---|
| 1,948,900 | 4/1971 | Germany...................... | 174/DIG. 6 |
| 1,167,054 | 10/1969 | Great Britain..................... | 174/15 C |
| 38-16986 | 9/1963 | Japan................................... | 174/28 |

Primary Examiner—A. T. Grimley
Attorney, Agent, or Firm—Kenyon & Kenyon Reilly Carr & Chapin

[57] ABSTRACT

A fluid cooled electrical cable, of the type including an electrical conductor immersed in a low-temperature cooling medium, an inner tube in which the electrical conductor and cooling medium are disposed, a radiation shield disposed about the inner tube, an outer tube concentrically disposed about the inner tube and spaced apart therefrom, and superinsulation disposed about the radiation shield and the inner tube within the outer tube and in which the inner tube is suspended in the outer tube by means of suspension wires attached thereto. The improvement comprises the provision of axially displaceable mounting means, fastened to the radially inner surface of the outer tube and coupled to the suspension wires for restraining the inner tube from circumferential movement about its longitudinal axis with respect to the outer tube. The mounting means is configured as a plurality of spaced apart, elongated, slotted tracks fastened to the inner surface of the outer tube, and a plurality of rollers mounted on at least one transverse axle disposed therein to which the suspension wires are coupled. The assembly permits the axial displacement of the inner tube with respect to the outer tube but restrains circumferential movement of the inner tube.

11 Claims, 1 Drawing Figure

PATENTED SEP 10 1974 3,835,240

FLUID COOLED ELECTRICAL CABLE

BACKGROUND OF THE INVENTION

1. Field of the Invention

The invention relates generally to electrical cables, and in particular, to a fluid cooled electrical cable in which the electrical conductors thereof are immersed in a low temperature cooling medium.

2. Description of the Prior Art

Electrical power cables having the conductors thereof immersed in a low temperature cooling medium are known in the art and generally comprise an inner tube suspended by wires within an outer tube, the former containing both the electrical conductors of the cable and a fluid cooling medium for cooling the conductors. Flexible sections of such cables are generally utilized to construct electrical power transmission lines, and are particularly useful as superconductive electrical cables.

More specifically, such cables generally comprise an inner tube containing the electrical power conductors through which a low temperature fluid coolant, such as a liquified gas (for example, helium) flows. The inner tube of such cables is sometimes called the "helium tube"; however, other liquified gases may be used as the cooling medium, such as, for example, nitrogen and hydrogen. When heat transfer between the cooling medium and the ambient temperature is limited by special construction in such cables, a very high thermal efficiency is achieved in the operation thereof.

Suppression of heat transfer between the cooling medium and ambient temperature is generally achieved by enclosing the inner tube of the cable in a larger tube disposed concentrically thereabout. This tube is generally called the "radiation shield," and is cooled by a separate cooling medium, such as, for example, nitrogen. Still another tube is concentrically disposed about the radiation shield to insure vacuum sealing of the entire cable and to protect the components of the cable, particularly the inner tube, from damage. A plurality of layers of thermal insulating foil, so-called "superinsulation," are disposed about the inner tube within the outer tube to prevent heat transfer therebetween.

German Auslegeschrift Pat. No. 2,019,036 discloses such an electrical cable. This patent teaches outer and inner corrugated tubes which equalize thermal stress produced by the temperature gradient existing between the outer tube (which is at room temperature) and the inner tube (which is at an extremely low temperature due to the flow of the cooling medium therethrough). The inner tube is suspended within the outer tube by thin wires disposed about the surface thereof and which extend radially outwardly through the superinsulation. A tubular suspension device, disposed adjacent the inner wall of the outer tube about the inner tube and the superinsulation, secures the ends of the wires for suspending the inner tube. The suspension wires are effective in preventing heat transfer between the inner and outer tubes, but do not permit the outer or inner tubes to be separately prefabricated and then subsequently assembled to form the cable. The inner tube, which is generally fabricated with the suspension device, cannot be axially inserted into the outer tube, and in known cable designs, the outer tube is provided with a cover which is closed after the inner tube and suspension device are inserted into the outer tube.

"Special Cryogenic Problems on the Performance of Superconducting Cables" by U. Hildebrant in "Conference on Low Temperatures and Electric Power" London, 1969, pages 105-111, discloses a fluid cooled electrical cable also using corrugated tubes attached by suspension wires. In this design, however, annular suspension rings disposed in the outer tube and engaging the inner surface thereof secure the ends of the suspension wires for mounting the inner tube in the outer tube of the cable. These suspension rings are displaceable axially along the inner surface of the outer tube, but cannot restrain circumferential twisting of the inner tube with respect to the outer tube when the former is moved therein. Furthermore, in order to prevent axial planar displacement of the support rings, and insure evenly distributed tension on each of the suspension wires, special axially disposed spacer members are required to be interposed between each of the support rings. In order to insure mechanical stability of the cable structure, the frictional forces securing the rings within the outer tube must be relatively large, and they prohibit the insertion of the inner tube and suspension rings into the outer tube subsequent to the prefabrication of the inner tube therewith.

In U.S. Pat. No. 3,758,701, a fluid cooled electrical cable is disclosed in which a radiation shield is disposed concentrically about the inner tube thereof. Several axially extending arc-shaped support members have the ends thereof attached to the outer surface of the inner tube, and include centrally disposed apex portions which have roller bearings mounted therein for engaging the inner surface of the radiation shield. This particular design permits the inner tube to be inserted into the radiation shield, and thus the shield, superinsulation, and outer tube of the cable can be separately prefabricated together. This cable construction does not, however, restrain circumferential twisting of the inner tube since the support members are not circumferentially restrained with respect to the outer tube and radiation shield. Such a design has the further disadvantage that since the support members must be of sufficient strength to withstand the weight of the inner tube and conductors, they must be of a minimum cross-sectional width, and thus precipitate heat transfer between the radiation shield and inner tube which significantly affects the thermal efficiency of the electrical cable.

SUMMARY OF THE INVENTION

It is therefore an object of the invention to provide a fluid cooled electrical cable which overcomes the disadvantages of heretofore known cables, and in which the inner tube thereof containing the cooling medium and electrical conductors is axially displaceable with respect to the outer tube thereof but is restrained from circumferential movement about its longitudinal axis.

These and other objects are achieved in a fluid cooled electrical cable of the type including an electrical conductor immersed in a low-temperature cooling medium, an inner tube in which the electrical conductor and cooling medium are disposed, a radiation shield disposed about the inner tube, an outer tube concentrically disposed about the inner tube and radiation shield, and superinsulation disposed about the shield and the inner tube within the outer tube, and in which the inner tube is suspended in the outer tube by means of a plurality of suspension wires in order to prevent heat transfer therebetween. The improvement of the invention comprises the provision of axially displaceable mounting means fastened to the radially inner surface of the outer tube and coupled to the suspension wires which restrain the inner tube from circumferential movement about its longitudinal axis with respect to the outer tube. In one embodiment of the invention, the mounting means comprises elongated slotted tracks axially disposed on the inner surface of the outer tube, and movable guide means, configured as roller members mounted on a transverse axle, disposed in the tracks and attached to the ends of the suspension wires. In another embodiment of the invention, a tubular radiation shield is fastened to the inner surface of the outer tube by radially extending support members, and the tracks are disposed on the radially inner surface of the radiation shield. The particular structural configuration of the inventive electrical cable thus restrains circumferential movement of the inner tube but permits axial movement thereof with respect to the outer tube and simplifies the fabrication of the electrical cable.

DETAILED DESCRIPTION

Figure 2:
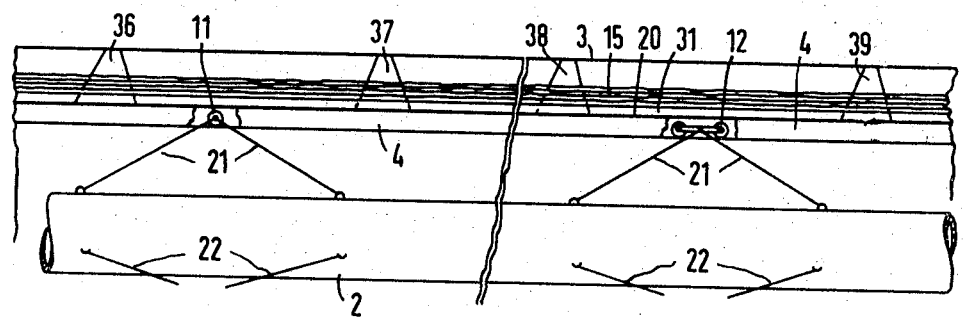
FIG. 2 is an axial cross-sectional view of the electrical cable, taken along section 2—2 of FIG. 1.
Figure 1:
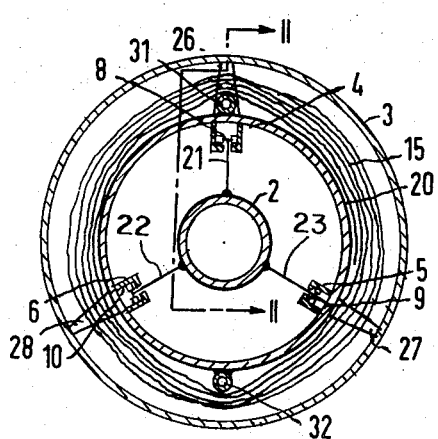
FIG. 1 is a cross-sectional view of one embodiment of a fluid cooled electrical cable constructed according to the invention.

Referring now to the drawings, in particular FIGS. 1 and 2, a fluid cooled electrical cable constructed according to the invention comprises a rigid inner tube 2 in which the cooling medium, which is preferably helium, and a plurality of electrical conductors (not shown) are disposed. A rigid tubular radiation shield 20, superinsulation 15, and a rigid outer tube 3 are concentrically disposed about the inner tube. Superinsulation 15 preferably comprises a plurality of layers of thin plastic film each of which is coated on one side with metallic material. A plurality of support members 26–28, which are constructed of low heat conductive materials such as steel or ceramic material, are secured at one end to the radially inner wall of outer tube 3 and at the other end to the outer surface of radiation shield 20. The shield is secured within tube 3 by means of the support members, the latter of which are designed so as to have a cross-sectional width which inhibits heat transfer between shield 20 and tube 3 through the support members. Space 2a, which separates radiation shield 20 from tube 2, is thermally insulated by coating inner tube 2 with an outer surface layer of material which reflects thermal radiation. Such a layer of reflective material may also be applied to the radially inner surface of radiation shield 20 to achieve the desired thermal insulation. Copper, or aluminum metal, for example, may be utilized as the reflective layer of material. Axially disposed tubes 31 and 32 are welded or soldered to the radially outer surface of radiation shield 20 and conduct a cooling medium, such as nitrogen, therethrough, for cooling the radiation shield. Inner tube 2 is suspended within radiation shield 20 by a plurality of suspension wires 21–23 which are fastened to the outer surface of inner tube 2 by means of known fastening devices (not shown). Displaceable mounting means, comprising track means configured as U-shaped slotted tracks 4–6 which are axially disposed and circumferentially spaced apart on the radially inner surface of radiation shield 20, and guide means configured as roller members 8–10 mounted on a transverse axle and slidably disposed within the slotted tracks, are coupled to the ends of the suspension wires to suspend inner tube 2 within radiation shield 20 and fasten the inner tube to the radially inner surface of outer tube 3. The mounting means permits axial movement of inner tube 2 with respect to radiation shield 20 and outer tube 3, but restrains circumferential movement of inner tube 2 about its longitudinal axis with respect to the radiation shield and outer tube.

FIG. 2 illustrates the cable of FIG. 1 in longitudinal section. The support members of the cable, designated by the reference numerals 36–39, are axially disposed in rows along the radially inner surface of outer tube 3. The suspension wires are similarly spaced apart axially within the radiaiton shield, and each comprises a pair of wires attached at one end to the radially outer surface of inner tube 2 and at the other end to a common guide means, designated by the reference numerals 11 and 12. Guide means 11 comprises a single transverse axle having rotatable roller members mounted on each end thereof. The roller members may comprise roller, ball or low-friction slide bearings. Guide means 12, however, is of multiple axle design, and comprises a pair of transverse axles on which the roller members are mounted which are joined by a rigid coupling member.

The particular advantage of the above-described electrical cable construction is that inner tube 2 may be inserted into outer tube 3 and radiation tube 20 after the radiation tube, superinsulation, and outer tube have been prefabricated as an integral unit. This is achieved by threading each of the guide means in the slide tracks as the inner tube is inserted into the cable radition shield, or as the radiation shield and outer tube are pulled over the inner tube.

Figure 3:
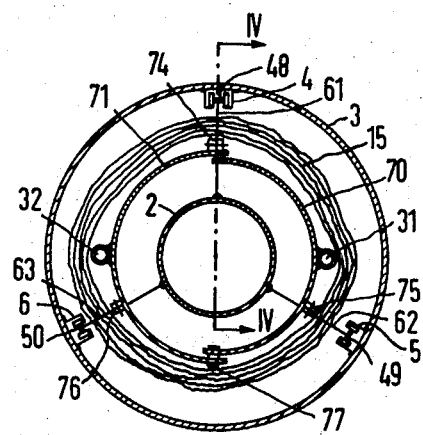
FIG. 3 is a cross-sectional view of another embodiment of a fluid cooled electrical cable constructed according to the invention.
Figure 4:
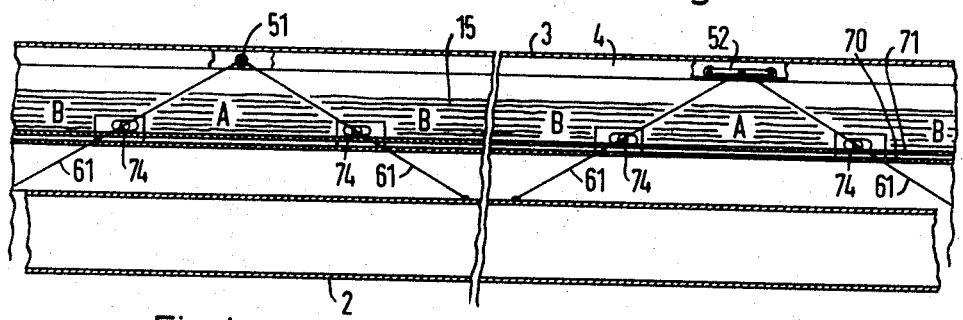
FIG. 4 is another axial cross-sectional view of the electrical cable, taken along section 4—4 of FIG. 3.

FIGS. 3 and 4 illustrate another embodiment of a fluid cooled electrical cable constructed according to the invention in which tracks 4–6 are fastened directly to the radially inner surface of outer tube 3, rather than indirectly by means of the radiation shield and support members described in the previous embodiment. Suspension wires 61–63 are attached to inner tube 2 and secure the inner tube within the outer tube. The ends of the wires are coupled to axially movable guide means 48–50 disposed in tracks 4–6. The radiation shield of the cable comprises a pair of semicylindrical curved members 70 and 71, which may be constructed of copper or steel sheet metal. Members 70 and 71 overlap at their ends and are joined and thermally insulated from each other by fastening members 74 and 77. The suspension wires pass radially outwardly through member 74 and through additional fastening members 75 and 76 disposed on the outer surface of the curved members. Each of fastening members 74–76 is axially movable to prevent excessive tensioning of the suspension wires by thermal contraction of the radiation shield and inner tube during cooling of the electrical conductors of the cable. Guide means 48–50, also configured as roller members mounted on a transverse axle, permit axial displacement of the suspension wires and inner tube but restrain circumferential movement thereof as previously described with respect to the first illustrated embodiment of the invention. Space 2a, between inner tube 2 and the radiation shield is thermally insulated by a layer of heat reflective material disposed on the outer surface of inner tube 2. The radially inner surface of the radiation shield may also be coated with a layer of heat reflective material. As previously noted, copper or aluminum are suitable materials to achieve such thermal insulation.

FIG. 4 illustrates the cable of FIG. 3 in longitudinal section. The fastening members 74–76 are axially displaceable as previously described, and comprise projection members 78 disposed in elongated slots 79 provided in the members. Within an entire cable section, selected fastening members can be made fixed rather than displaceable so that the inner tube cannot shift too far with respect to the radiation shield, since only limited expansion of the radiation shield with respect to the inner tube is permitted by the slots of the fastening members. Guide means 51 and 52 are configured similar to guide means 11 and 12 illustrated in FIGS. 1 and 2.

In the assembly of the electrical cable illustrated, inner tube 2, the radiation shield, and the superinsulation may be prefabricated together and subsequently inserted into the outer tube 3. To accomplish this, the inner tube is preferably suspended by the suspension wires in the fabrication fixture, and the radiation shield and superinsulation are then disposed about the tube. In order to obtain access to space A to install the superinsulation, the wires are disengaged from the guide means 51 and 52 and spread apart. After the shield is wrapped with the superinsulation, the wires are reconnected to the guide means. Space B is then filled with superinsulation. The outer tube may then be pulled over the inner tube, radiation shield and superinsulation, or the prefabrication inner tube and associated components may be inserted into the outer tube, by successively threading the guide means into the tracks of the outer tube.

Figure 5:
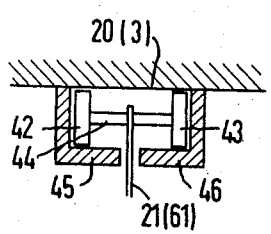
FIG. 5 is a cross-sectional view of one embodiment of a displaceable mounting means for an electrical cable constructed according to the invention.

FIG. 5 illustrates in detail the previously described guide means of the electrical cables of FIGS. 1 and 3. A pair of roller members 42 and 43 are mounted on a transverse axle 44 including a groove (not shown) in which the suspension wires are slidably disposed. The suspension wires are looped around the axle. Each track is comprised of a pair of L-shaped angle iron members 45 and 46 disposed adjacent each other and fastened to the radially inner wall of the outer tube. The angle iron members form a U-shaped track having an elongated groove 44a therein for axially guiding the suspension wires. The surfaces of the tracks are preferably lubricated to reduce frictional forces between the roller members 42 and 43 and the angle iron members 45 and 46. It should be noted that the guide means may have other configurations, such as the trolley-like assembly having four or more roller members illustrated in FIGS. 2 and 4. In such trolley-like structures, the axles thereof are joined by a rigid coupling member to which the ends of the suspension wires are attached.

While there have been disclosed herein what are considered at present to be the preferred embodiments of the invention, it will be obvious to those persons skilled in the art that many changes and modifications may be made thereunto. It is therefore intended in the appended claims to cover all such changes and modifications as fall within the true spirit and scope of the invention.

What is claimed is:

1. In a fluid cooled electrical cable, of the type including an electrical conductor immersed in a low-temperature cooling medium, an inner tube in which the electrical conductor and cooling medium are disposed, a radiation shield disposed about the inner tube, an outer tube concentrically disposed about the inner tube and radiation shield and superinsulation disposed between the radiation shield and the outer tube, the inner tube being suspended in the outer tube by suspension wires, the improvement comprising, a plurality of displaceable mounting means, fastened circumferentially about the radially inner surface of said outer tube, each one of said plurality of mounting means coupled to at least a corresponding one of said suspension wires, said mounting means being movable axially with respect to said inner and outer tubes, for restraining said inner tube from circumferential movement about the longitudinal axis thereof with respect to said outer tube.

2. The electrical cable recited in claim 1, wherein said displaceable mounting means comprises elongated track means, fastened to the inner surface of said outer tube and disposed axially with respect thereto, and guide means, coupled to said suspension wires and disposed in said track means.

3. The electrical cable recited in claim 2, wherein said track means comprises a plurality of spaced-apart elongated U-shaped slotted tracks, and wherein said guide means comprises a plurality of roller members mounted on at least one transverse axle to which said suspension wires are coupled.

4. The electrical cable recited in claim 3, wherein said guide means comprises a pair of transverse axles on which said roller members are disposed, and a rigid coupling member, coupled to said transverse axles, said suspension wires being coupled to said rigid coupling member for supporting said inner tube in said outer tube.

5. The electrical cable recited in claim 2, further comprising a tubular radiation shield, concentrically disposed about said inner tube and fastened to said inner surface of said outer tube by a plurality of rigid support members, said track means being mounted and axially disposed on the radially inner surface of said radiation shield.

6. The electrical cable recited in claim 2, wherein said track means is mounted on the inner surface of said outer tube.

7. The electrical cable recited in claim 6, further comprising a tubular radiation shield, concentrically disposed about said inner tube and secured in said outer tube by said suspension wires.

8. The electrical cable recited in claim 6, wherein said radiation shield is tubular in shape and comprises a pair of semi-cylindrical shaped curved members coupled at each end thereof.

9. The electrical cable recited in claim 2, wherein said superinsulation is disposed between said radiation shield and said outer tube, and wherein said outer surface of said inner tube is coated with a layer of thermal radiation reflective material.

10. The electrical cable recited in claim 9, wherein the inner surface of said radiation shield is also provided with a layer of thermal radiation reflective material.

11. In the assembly of a fluid cooled electrical cable of the type including an electrical conductor immersed in a low temperature cooling medium, a rigid inner tube in which the electrical conductor and cooling medium are disposed, a radiation shield disposed about the inner tube, an outer tube concentrically disposed about the inner tube and the radiation shield, and superinsulation disposed between the radiation shield and the outer tube, the inner tube being suspended in the outer tube by means of suspension wires, the method of connecting the inner and outer tubes, comprising the steps of:

fastening a plurality of elongated, axially disposed track means configured as slotted tracks, circumferentially to the radially inner surface of said outer tube;

fastening axially displaceable guide means configured as movable roller members mounted on at least one transverse axle to the end of the suspension wires; and while interdisposing said inner tube, radiation shield and superinsulation in said outer tube, successively threading said guide means into a corresponding one of said plurality of track means to suspend said inner tube within said outer tube.

* * * * *

UNITED STATES PATENT OFFICE
CERTIFICATE OF CORRECTION

Patent No. 3,835,240          Dated September 10, 1974

Inventor(s) Günther Matthäus

It is certified that error appears in the above-identified patent and that said Letters Patent are hereby corrected as shown below:

In column 6, line 62 (claim 8) change " The electrical cable recited in claim 6" to --The electrical cable recited in claim 7--

Signed and sealed this 3rd day of December 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,835,240   Dated September 10, 1974

Inventor(s) Günther Matthäus

It is certified that error appears in the above-identified patent and that said Letters Patent are hereby corrected as shown below:

Address of inventor incorrectly given as "Hohe Warte". Please change to --Spardorf--

Signed and sealed this 4th day of March 1975.

(SEAL)
Attest:

RUTH C. MASON
Attesting Officer

C. MARSHALL DANN
Commissioner of Patents
and Trademarks